United States Patent

Quinlivan et al.

[11] 4,024,539
[45] May 17, 1977

[54] METHOD AND APPARATUS FOR FLIGHT PATH CONTROL

[75] Inventors: Richard P. Quinlivan, Binghamton; Harry H. Westerholt, Vestal, both of N.Y.

[73] Assignee: General Electric Company, Binghamton, N.Y.

[22] Filed: Apr. 15, 1966

[21] Appl. No.: 448,373

[52] U.S. Cl. .......................... 343/11 R; 343/7 TA; 343/108 SM
[51] Int. Cl.² .......................................... G01S 9/02
[58] Field of Search ............... 343/11 R, 7.9, 7 TA, 343/108 SI; 73/178

[56] References Cited
UNITED STATES PATENTS 3,896,432  7/1975  Young ............................ 343/7.9 X Primary Examiner—T.H. Tubbesing
Attorney, Agent, or Firm—I. David Blumenfeld

[57] ABSTRACT

Signals from a source of flight path data, normally a memory device which stores forward-looking radar data, for example, are sampled in "reverse-time". That is, the data points along the flight path are taken in reverse order relative to the direction of flight. By simple circuits, the signals from the flight path data source are modified to conform with the basic criteria of the desired flight and with other desired parameters such as vertical acceleration and velocity limits so that a reverse-time flight simulation is made. The special "inside-out" form of indicia is a pair of bands which are fence-like in appearance and form the vertical sides of a tunnel-like outline, along the vertical center of which is the desired flight path. By generating these bands on a cathode ray oscilloscope with vertical displacements in accordance with the desired flight path and relative vertical widths in perspective with the range, the curved center line is easily followed.

3 Claims, 6 Drawing Figures

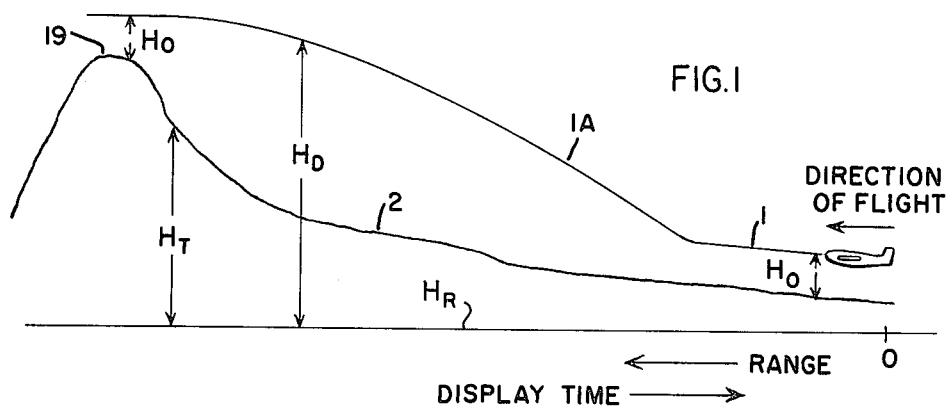
FIG.1
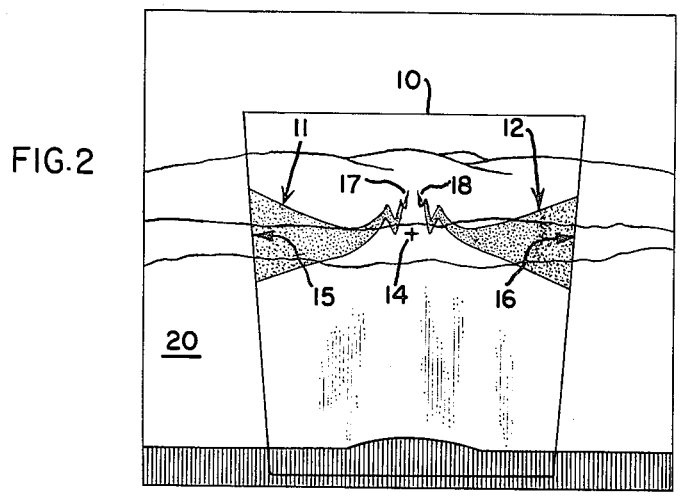
FIG.2
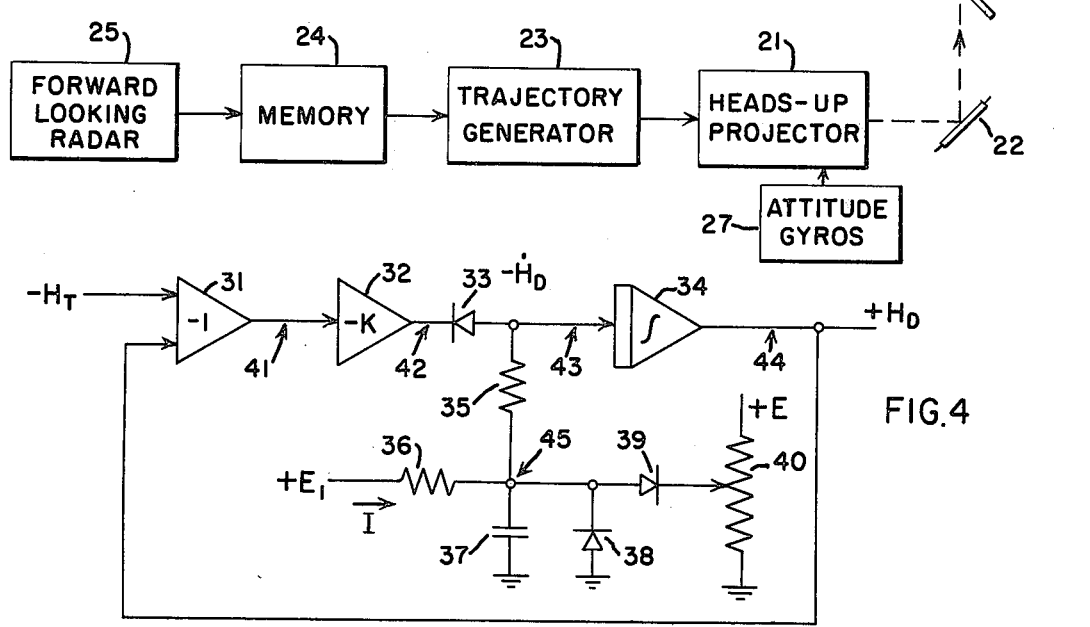
FIG.3
FIG.4

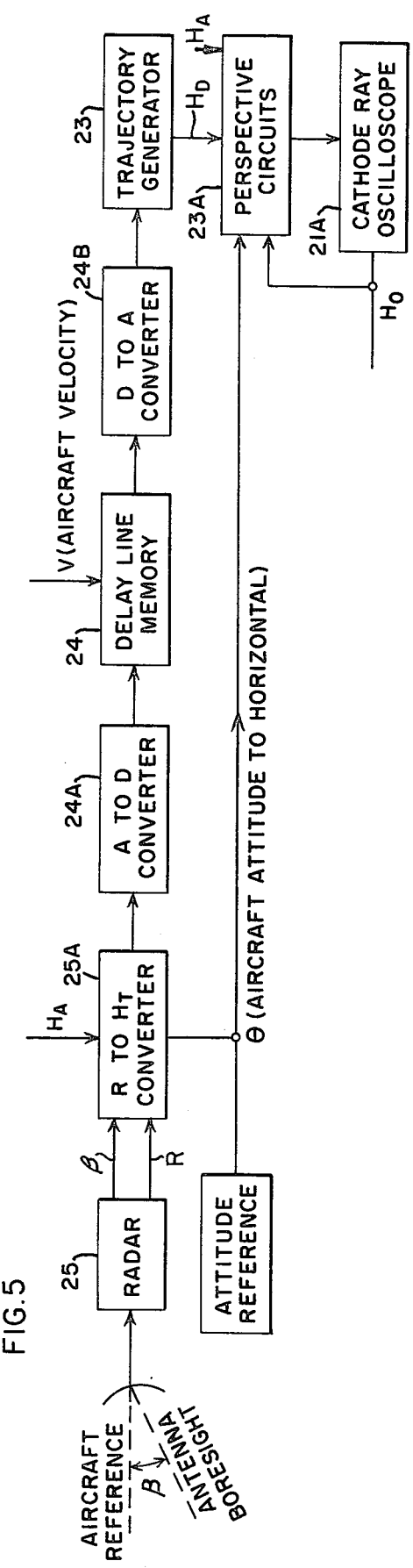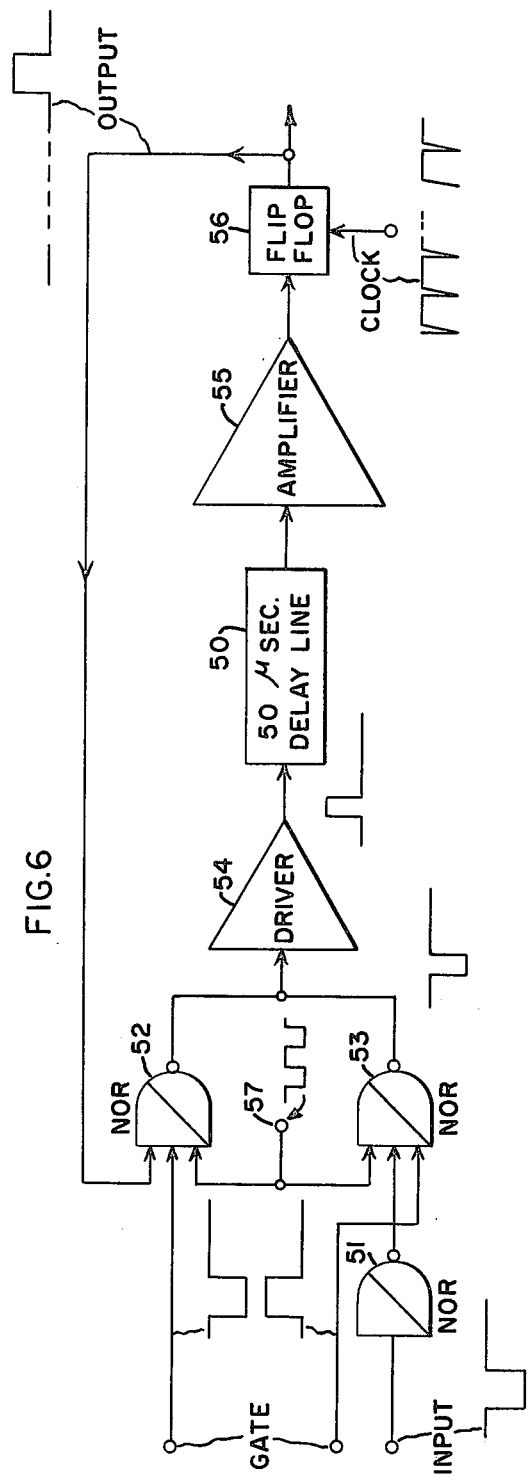

METHOD AND APPARATUS FOR FLIGHT PATH CONTROL

This invention is directed to the generation, processing, and presentation of data for aiding manual operation of aircraft whereby a desired path in a vertical plane or in three dimensions is followed closely. Indicia in a novel form are displayed which present desired flight path information pictorially with perspective as an "inside-out" display having geometrical relations corresponding to the apparent dimensions of the ground and flight path relative to the aircraft and pilot.

In the representative terrain-following situation illustrated in FIG. 1, the objective is to fly an aircraft over the terrain 20 at as low an altitude as possible. Normally, a desired minimum clearance is selected such as 250 feet. Other considerations notwithstanding, the desired flight path is the terrain profile displaced by the 250 feet clearance. In practice, particularly with high speed aircraft, this is difficult to achieve. It has been found that pilots generally can not accurately estimate the actual terrain profile and the range to specific terrain features so as to fly an aircraft with terrain-following precision, even with inordinate concentration. Accordingly, various kinds of equipment have been developed to aid the pilot. Probably, the best technical performance is attained by substituting automatic control. However, this presents problems in respect to pilot confidence, cost, reliability, and it has the inherent disadvantage of failure to utilize the existing asset of pilot skill and judgement of the total requirement.

The most common and simple measure of terrain-following performance is the average terrain clearance. It is believed that in practice, the degree of success in manual terrain-following is primarily dependent upon how well the pilot anticipates peaks. That is, if he begins his climb over a peak too late, he will overshoot; and if he begins his climb too soon, he will fly too high during the approach to peaks. Because of the practical limitations of crews, the accelerations permissible are limited. As seen in FIG. 1, this results in a desired path segment 1A for an aircraft clearing a peak 19 without overshoot and with a representative negative acceleration limit of 0.5 G. The key operation is to begin the climb at the proper point to get on this 0.5 G path 1A segment so as to pass over the peak with a horizontal flight path direction so that downward movement can immediately commence. Manual terrian-following is also made increasingly difficult as the visibility is decreased.

There are severe problems in effectively displaying data to assist manual control operation. A dial or some other simple single variable display informing the pilot of the instantaneous requirements with or without anticipation or quickening for terrain-following does not permit sufficiently accurate performance. This approach makes the pilot a manual link in a semi-automatic control loop. A primary cause of imprecision is that pilots vary in the amount of lead or lag in their response to the displayed commands.

Even more important is the problem of reasonable flexibility and versatility. Automatic and semi-automatic systems are inherently unsuitable for allowing variation from the norm. When it is desirable to avoid special obstructions such as towers or to detour around a particular area, present terrain-following aids are of little value. They fail to provide information performed which a pilot can extrapolate or use as a reference guide for special maneuvers. Furthermore, pilot skill in not properly utilized and pilot confidence is poor because the pilot must perform his functions in a mechanical fashion which has little resemblance to normal flying. FIG. inside-out terrain One aspect of these problems is that manual flying is normally preferred by the use of knowledge and experience of the relationship between aircraft flight characteristics and a desired flight path relative to a scene viewed by a pilot. In other words, the normal pilot procedure in this kind of problem is to visualize a flight path relative to the observed terrain and then operate his controls so as to realize the desired flight path. This visualized flight path is a geometrical entity. Conventional indicators are not appropriate for presenting this type of information. If the data is available and it is in two dimensions only, it might be presented in the form shown in FIGURE 1. However, this information is in an "outside-in" form relative to the aircraft. That is, it does not prevent data from the viewpoint of the pilot's position in the aircraft and is, therefore, not in an "inside-out" form. It requires time consuming mental transformation from the "outside" to the pilot's "inside" position. Furthermore, the primary variables of interest are the range to prominent terrain features and the heights of these terran features. This data, relative to the aircraft, is essentially a continuum of position vectors from an origin at the pilot to the desired flight path. The direct presentation of the magnitude of a range vector in an inside-out form from the origin is impossible. Accordingly, the effective display of this height and forward range data is difficult.

Similar problems exist for aircraft landing control. The desired approach path for landings is in a vertical plane or a simply curved vertical surface. Manual control requires the knowledge or estimation of the continuum of range vectors to the approach path.

In the past, various forms of "heads-up" displays have been provided for various purposes which are all characterized by the feature of superimposing data in the natural field of view of a person observing a scene in which he is performing a control function. In perhaps its simples form, a heads-up display projects panel instrument data on a vehicle wind screen so that an operator can more readily share his attention with the scene in front of him, thereby avoiding blind periods during which his head is down reading the panel instrument. Heads-up displays have been used to present geometric data for control purposes of which aircraft fire control data is probably the most common example. In such displays, a collimated image in two dimensions is projected which commonly includes such indicia as a symbol representing the proper aircraft direction for firing. Such data can be effectively presented in heads-up form, but it is difficult to present vertical plane or three-dimensional data relating to range which is directly meaningful in respect to the observed scene.

Accordingly, it is an object of the invention to provide a process for generating and displaying desired trajectory data for manual operation of aircraft control systems which does not rely on special skills but enables a pilot to utilize conventional control operations for path following.

It is another object of the invention to provide a display which enables a pilot to follow a desired flight path more closely and/or with less concentration by providing effective pictorial data which enables appropriate anticipation in manual control.

It is a further object of the invention to provide a heads-up display for terrain-following which presents flight path in an inside-out pictorial form corresponding to the pilot observed scene so that the generated path data can be readily correlated with as much visually observed terrain data as the visibility conditions permit.

It is another object of the invention to produce data, for directing manual control of an aircraft relative to some selected reference path, in a form which permits substantial departures from the selected flight path directions without the provided data losing its meaning such that the data is useful whether the aircraft is near the selected reference path or departs from that path.

Briefly stated, in accordance with certain aspects of the invention, a terrain-following display is provided which utilizes relatively simple digital and/or analog computer components to modify signals from a source of flight path data in accordance with the existing aircraft parameter limitations and to control a conventional source of two-dimensional pictorial data so as to present indicia in a special "inside-out" form whereby the desired flight path is readily deduced. The signals from the source of flight path data, normally a memory device which stores forward-looking radar data, for example, are sampled in reverse-time. That is, the data points along the flight path are taken in reverse order relative to the direction of flight. By simple circuits, the signals from the flight path data source are modified such as by placing vertical acceleration and velocity limits on the desired flight path so that a reverse-time flight simulation is made. The special inside-out form of indicia is a pair of bands which are fence-like in appearance and form the vertical sides of a tunnel-like outline, along the vertical center of which is the desired flight path. By use of selected display constants, the displayed bands have dimensions which correspond to an actual tunnel having the selected cross-section dimensions. By generating these bands on a cathode ray oscilloscope with vertical displacements in accordance with the desired flight path and relative vertical widths in perspective with the range, the curved center line is readily deduced. It has been found that a pilot with average skill can then easily follow the desired path closely, either from the display alone, or from the display projected as a heads-up display. In the latter case, the pilot's confidence is extraordinary because he can compare the display directed maneuvers with actual performance in detail, weather conditions permitting.

The invention, together with further objects and advantages thereof, may best be understood by referring to the following description taken in conjunction with the appended drawings in which like numerals indicate like parts and in which:

FIG. 1 is a diagram illustrating the terrain following problem in a vertical plane.

FIG. 2 illustrates a terrain-following display in accordance with the invention.

FIG. 3 is a block diagram illustrating a preferred method of implementing the invention.

FIG. 4 is a diagram, partially schematic, illustrating apparatus for implementing the trajectory generator of FIG. 3.

FIG. 5 is a block diagram illustrating the FIG. 3 system in greater detail.

FIG. 6 is a block diagram of the FIG. 3 delay line memory.

A heads-up display for terrain-following is shown in FIG. 2 in which a pair of indicia bands 11 and 12, which are mirror images of each other, are projected onto a transparent screen 10. The screen 10 is a flat dichroic glass plate through which the pilot's view of the terrain scene 20 along the flight path is basically unobstructed. The image source for bands 11 and 12 is a conventional heads-up projector 21 forming a part of the system shown in FIG. 3 for sensing the forward terrain height profile and processing appropriate data signals therefrom. The image is produced by a conventional high intensity cathode ray oscilloscope from which the image is projected with collimating optics in the same manner as in fire control sights. The bands 11 and 12 are interpreted as vertical fences forming sides to a tunnel within which the aircraft is flown. As representative values, the indicia bands are scaled so that the apparent real world scene distance between the bands is 200 feet and the bands begin 750 feet in front of the aircraft at the near edges 15 and 16 and extend forwardly for five miles along the desired flight path while appearing to converge towards the desired flight path at their far ends 17 and 18. The vertical dimensions of bands 11 and 12 are scaled to represent 50 feet at every range. This scaling and the convergence of the indicia bands towards the actual flight path create perspective and permit registration of the bands with the terrain as viewed through a heads-up display. To assist in the use of the generated flight path, indicia bands 11 and 12, a symbol 14 in the form of a cross, circle or other point designation is provided representing the instantaneous actual flight path direction.

The heads-up projector 21 is provided a signal by a trajectory generator 23 representing the desired flight path clearance profile for terrain-following. Details of a suitable simple analog signal generator are shown in FIGURE 4. The forward-looking radar 25 scans the terrain and applies the resulting signals to memory 24. The desired flight path data signals are derived from the terrain profile data in memory 24 which is made available in reverse-time, a requirement imposed by the method of trajectory generation. That is, the data on the forward terrain profile is operated upon serially from greatest range towards the aircraft so that the data timing is in reverse order relative to the actual real-time progression of the aircraft relative to the data points.

Forward-looking radar, such as type AN/ASG14 radar provide suitable reference data signals. Conveniently, the radar output signals are stored by glass delay line memory 24, in circulating digital form, and applied to the trajectory generator 23 in analog form. In applying the invention to landing control applications or other aircraft path control applications, exact profile data may come from permanently stored or telemetered data. Any heads-up projector which presents a collimated bright image of the desired path fence indicia 11 and 12 from the cathode ray oscilloscope, such as the projector disclosed in French Patent No. 1,276,968 is preferred for presenting the pictorial data in a form which is unchanged by movement of the observer's head. Even without projection, as observed on a cathode ray oscilloscope or the equivalent, the pictorial data is in an inside-out form preferred by pilots as a general rule. In the FIG. 1 terrain-following situation, 2 is the terrain profile along the line of flight at $H_T$ from a reference height $H_R$; and 1A refer to the desired flight path at height $H_D$; and $H_o$ is the desired minimum clearance or minimum separation between the desired flight path 1 and terrain profile 2. The analog computation apparatus to generate this flight path is shown by the circuit schematic in FIG. 4. The purpose of the circuit of FIG. 4 is to generate from a point spaced $H_o$ above the tops of hills towards the craft a path 1A having a constant acceleration. This path (1A) is so chosen as to cross the peak of each hill at elevation $H_D$ i.e. ($H_T+H_o$) with zero vertical rate of change i.e. $\dot{H}_D$ = o. The constant acceleration path is also modified slightly by being limited in maximum vertical rate. In addition, in those places where it is possible because of the smoothness of the terrain profile for the craft to negotiate the exact terrain contour it is desirable for the path to be congruent to the terrain profile offset $H_o$ distance. The circuit of FIG. 4 accomplishes these objectives. When the limits are not active the circuit acts as a straight forward servo loop with the Laplace transfer function:

$$H_D(s) / H_T(s) = -1 (1 + s/K)$$

Where ($s$) is the Laplace operator and $K$ is amplification of 32. For large values of $K$ relative to the rates of change of $H_T$ (i.e. $\dot{H}_T$), $H_D$ is essentially equal to $H_T$. The input to integrator 34, which is $-\dot{H}_D$ by definition, is approximately $-\dot{H}_T$. For positive $\dot{H}_T$ (in the reverse readout direction) the servo loop remains closed and $H_D$ approximates $H_T$. When $\dot{H}_T$ is negative the associated diodes, resistors and capacitor of FIG. 4 serve to compare $\dot{H}_T$ and its derivatives against predetermined limit values. If $\dot{H}_T$ is sufficiently smooth to remain within those limits the servo loop remains closed and $H_D$ is approximately equal to $H_T$. When $\dot{H}_T$ and its derivatives exceed those limits, the acceleration and rate limited trajectory 1A is constructed.

The time scale of this path generation is conveniently that of the reverse time readout of memory 24.

The operation of this circuit is essentially that of a straightforward servo loop. When $\dot{H}_T$ is positive-going, point 41 is positive-going, point 42 is negative-going, and diode 33 conducts. As long as diode 33 is conducting, the whole computation is a closed loop servo with the operational Laplace transform transfer function:

$$H_D(s)/H_T(s) = -1/(1 + s/K)$$

If $K$ is large, the error between $H_D$ and $H_T$ is small. As long as $\dot{H}_D$ is positive diode 33 remains conducting because of current flow through diode 38 and resistor 35. Diode 38 performs the additional function of preventing integrating capacitor 37 from charging while $\dot{H}_D$ is positive (and point 42 is negative). When $\dot{H}_T$ becomes negative-going, point 42 immediately goes positive. At the same time, the voltage at point 45 begins going positive, causing diode 38 to stop conducting. The voltage at 45 increases from zero as integrating capacitor 37 is charged by voltage $E_1$ through resistor 36. With the impedance of resistor 36 chosen large relative to the impedance of capacitor 37 and low level voltages at point 45, the current through resistor 36 is a constant current I. If the voltage at 42 increases more slowly than the voltage at 45, then diode 33 still conducts and the loop is still closed, with $H_D$ still following $H_T$ in the same fashion as when $\dot{H}_D$ is positive. If, however, the voltage at 42 increases faster than the voltage at 45, then diode 33 stops conducting and the input to the integrator is essentially the voltage at 45.

This results in approximately a constant rate of change of $\dot{H}_D$, that is, a constant acceleration. Selecting I therefore limits $\ddot{H}_D$. Also, when the voltage at point 45 reaches the voltage set by potentiometer 40, diode 39 conducts, limiting $\dot{H}_D$ to a maximum negative value. The end result of this computation is a waveform which follows its input for one polarity of the first derivative of the input and follows its input, with limits on the first and second derivatives of the input, for the opposite polarity of the first derivative of the input. This form of computation does not incorporate the fixed clearance offset term $H_O$. Accordingly, the output of the FIG. 4 trajectory generator 23 is actually the desired height minus this offset. This is permissible because this term is readily introduced by subsequent algebraic addition of the desired fixed clearance height signal $H_O$.

In order that the display present the desired pictorial information to the pilot in a perspective manner (so as to be viewed in correspondence with the real world), both axes of a conventional cathode ray oscilloscope are driven with voltages inversely proportional to range as a linear function of time. The horizontal drive is:

$$E_h = K_h S_h / R(t)$$

where $S_h$ is the selected fence offset ($\pm 100$ ft. in FIG. 2), and the vertical drive is:

$$E_v = K_v[\theta + (H_D(t) - H_A + H_o + s_v)/R(t)]$$

where $\theta$ is the pitch angle of the aircraft's display axis, $H_A$ is the aircraft altitude, $S_v$ ranges from the fence bottom to fence top ($-25$ ft. to $+25$ ft. in FIG. 2), and $K_h$ and $K_v$ are oscilloscope display source constants which scale the display to the proper dimensions for viewing as determined by the selected band indicia dimensions and viewer to display distance. Conveniently, the fences are formed by superimposing a high frequency sinusoidal voltage signal.

Considering the terrain-following system of the FIG. 3 embodiment more specifically, additional details are shown in FIG. 5. The range signals R from forward-looking radar 25 are converted to terrain height signals $H_T$ on the basis of aircraft altitude $H_A$ relative to sea level or some other reference altitude, the aircraft pitch attitude $\theta$ relative to the horizontal plane, and the instantaneous radar antenna scanning angle $\beta$, $H_T = H_A + R\sin(\beta + \theta)$. Signals for $\theta$ and $H_A$ are provided by existing instrumentation such as conventional inertial navigation apparatus or by the flight control pitch gyro and the barometric altimeter instrument or the like. Accordingly, the range-to-height converter generates signals representing terrain height $H_T$ along a profile section determined by the azimuth of the plane in which the radar antenna scans. Normally, this is approximately in the same direction as the aircraft flight path direction and can be made precisely so by introducing antenna control in accordance with aircraft drift angle and roll. Under normal conditions when terrain-following, the aircraft air speed is approximately constant for the periods of time of concern here and, therefore, both the terrain profile height positions, and the aircraft future flight path positions are approximately linearly proportional to flight time. Accordingly, ranges to terrain features are proportional to flight time. On the other hand, radar generated terrain height, $H_T$, signal points are randomly distributed with respect to range and thus with flight time. That is, as the radar scans at a constant rate, the return signals are not at equal time intervals. This is important because the trajectory generator 23 relies on the terrain signals $H_T$ to be provided approximately in accordance with ground distance or flight path time. Accordingly, it is desirable to apply height signals $H_T$ to the trajectory generator 23 in respect to time on the basis of range. To accomplish the ordering of radar generated $H_T$ uniformly by range the radar generated terrain height $H_T$ is located in a memory 24 at a location corresponding to its measured range. The memory may then be interrogated uniformly with range in the desired reverse order to produce the required terrain altitude versus reverse range signal for the trajectory ($H_D$) generation.

It is preferable to utilize digital techniques for storing the forward terrain data. The analog-to-digital converter 24A is provided to produce the required digital signals. In the FIG. 6 embodiment, nine parallel bits representing an $H_T$ point are stored in nine glass delay lines. Each delay line 50 in FIG. 6 propogates one bit in synchronism with an index counter which represents range. Typically, the delay lines are driven at a bit rate of five megacycles per second and produce a fifty microseconds delay. Suitable circuitry including input and output signal amplifiers 54 and 55 for the delay lines is shown in FIG. 6. The output is recirculated through the delay line 50 if no input signal is applied from the analog to digital converter 24A which would override it. A square-wave applied to terminal 57 in parallel with the index counter, not shown, tends to apply a train of pulses to each delay line 50. However, these square-wave pulses are gated by NOR gates 52 and 53. The input signal is inverted by NOR gate 51 so that the recirculating delay line pulse from flip-flop 56 can be compared with it. Representative scaling is such that the digital numbers represent terrain height samplings at one hundred feet intervals and the least significant bit represents an altitude increment of twenty feet. Because the invention requires processing of the terrain height signals $H_T$ in reverse-time, it is necessary to reverse the order of data because the data is stored from the near range to the far range. Accordingly, the signals are read out of the delay lines, one number for each circulation, with the selection read-out point shifted each circulation. With two hundred fifty samples, this results in about twelve milliseconds for one scan. Because this time is significant relative to the flight motion and data processing time, it is preferably accommodated by modifying the count in the master index counter in accordance with the aircraft ground speed. The digital storage output signals are applied to the trajectory generator 23 by means of the digital to analog converter 24B. This results in a desired trajectory being generated about eighty times a second. Because of the persistence effects of the cathode ray oscilloscope screen and the human eye, the desired trajectory data signals are apparently continuous with only slight flicker effect.

In the relatively low complexity system of the preferred embodiment, the determining constraint is the limit on negative acceleration, $\ddot{H}_A$. The desired flight path follows the terrain contours directly until a contour is sensed which requires a departure from this direct terrain-hugging path as indicated by the transition from the path 1 in FIG. 1 to path segment 1A. Roughly speaking, the constraints have the effect of generating a trajectory over peaks which is a segment of a circle having its center on a vertical line beneath the peak and having a radius which is proportional to the square of the aircraft velocity so as to limit the centripetal acceleration. For unusually high peaks, this relationship is modified by terminating the circle segment at a point where the aircraft's descending velocity componet reaches a selected limit value after which the generated trajectory is a straight line. This straight line portion extends to the junction with a direct terrain-hugging portion of the desired flight path. This second order discontinuity in the generated desired flight path is seen as a required step increase in the rate of climb by the pilot. This change to the same rate of climb for a given cruising speed is common to all extreme situations. With limited experience, the pilot becomes familiar with this "worst case" condition at a given ground speed and can readily extrapolate to other speeds. Clearing peaks becomes a maneuver which is done easily and with confidence. It should be apparent that to perform the same maneuver with independent judgement on a case-by-case basis requires a number of complex mental operations to estimate where, when, and what degree of flight change should be made.

While in the embodiment described above, it is a projected offset, terrain path to be followed, it is obvious that the control process is applicable to any flight path. The generated fence indicia are analogous to a motor vehicle road which the aircraft can actually negotiate. With a data source generating a landing approach path, a traffic control pattern, or target intercept path, for examples, it can be seen that a realistic desired flight path trajectory, which accounts for aircraft and crew constraints, can be generatad and effectively presented in pictorial form without impractical complexity. It should be noted that this process automatically performs the function of integrating the external path information into a directly useful form in respect to the actual aircraft position and velocity which is directly meaningful in respect to the pilot's inside-out point of view of the situation. In the examples mentioned above, such as the landing approach, two additional variables of interest are introduced. The lateral position and speed or longitudinal position of the aircraft must be controlled during landing and generally it is desirable to include this information in the display. This is readily implemented for the former by providing an offset deflection voltage for the fence band indicia 11 and 12 of FIG. 2 proportional to the lateral displacement of the desired trajectory from aircraft's present flight path. Alternatively, a second pair of indicia bands can be generated, perpendicular to, but essentially generated in the same manner as the first pair of bands. Each pair of bands then form brackets defining a flight path tunnel. That is, at any given future flight distance, a set of points along the indicia bands bracket the desired flight path point. The bands are sufficiently spaced so that the pilot can see the desired flight path undulations and the perspective enables him to make range allowances. The pilot can therefore use his basic skill and experience to initiate important maneuver changes at the critical points.

Another desirable feature is that the indicia readily provide limit information. As a practical matter, an aircraft can not follow a particular flight path exactly. The objective is to keep an aircraft within certain limit distances of the flight path. By selecting the width of the indicia bands to correspond to the limit distances in accordance with the scale of the display, the pilot is relieved of estimating the relationship between his actual flight path and the desired flight path in respect to the permissable limits.

Furthermore, when special considerations require an excursion from the generated desired flight path, the pilot retains the benefit of the display data. The generated flight path data is still presented, but is seen in it proper perspective relative to the off-path position of the aircraft. It can therefore be used by the pilot for reference information during the excursion and makes return to the normal path-following mode simple.

In the preferred embodiment, the generated band indicia have a continuous flat, fence-like, shape. Other shapes can be used and the indicia can be discontinuous, if the indicia presents equivalent data.

In processing the data from the raw reference form such as radar signals, the key feature enabling non-complex data processing apparatus is the provision and use of apparatus for reverse time signal processing. The generation of a desired trajectory meeting the usual requirements for terrain following is a two point boundary-value problem. A flight path is simulated from the farthest data point towards the present aircraft position. It is relatively easy with this approach to introduce the boundary value, generate a path, and introduce constraints so that crash-causing low altitudes are avoided and the aircraft constraints (generally crew acceleration tolerance dominates) are observed. The actual data processing techniques are little different from regular real-time simulation. While the control system analysis is complex, the reverse time process and inherent data limitation make the actual process simple, reliable and stable. The primary data limitation is that operation is arranged so that the path data always extends far enough forward for the particular aircraft to be capable of climbing the required altitude in the distance provided.

As to intermediate points, the preferred embodiments assures the possible by never generating a trajectory from an intermedite peak outside the given constraints. In effect, each intermediate peak becomes a boundary value. Stability is assured by the nature of the process. Constraints are selected such that the flight path generated is within any possible unstable condition.

While particular embodiments of the invention have been shown and described herein, it is not intended that the invention be limited to such disclosure, but that changes and modifications can be made and incorporated within the scope of the claims.

What is claimed is:

1. Apparatus for assisting manual path following control of an aircraft comprising:
    a. memory means for storing signals representing a reference data path;
    b. read-out means, responsive to said memory means, for producing said signals in repetitive time sequences from the distant end of the path scanned towards the aircraft, each time sequence being made short relative to the time required to traverse the path segment from which the reference data signals were stored;
    c. electronic computational apparatus, responsive to said read-out means for generating trajectory signals representing a line corresponding to the flight path of the aircraft flying from the distant end of the stored path towards the present position along the path, as modified to conform to the aircraft flight envelope;
    d. a display projector;
    e. coordinate transformation means for converting said trajectory signals to coordinates corresponding to the pilot observed scene with perspective;
    f. signal processing means for further modifying said trajectory signals to produce in said projector a pair of trajectory lines symmetrically displaced from a center trajectory by an amount sufficient to enable inspection of undulations as projected on a vertical plane transverse to the center trajectory;
    g. additional signal processing means for modifying the said pair of trajectory lines by an amount corresponding to the permissible flight path deviations to form trajectory bands.

2. Apparatus for assisting manual path following control of an aircraft in a terrain following mode comprising:
    a. terrain profile sensing means including airborne forward scanning radar means for generating reference path signals representative of the elevations of the undulating terrain along the azimuth of flight;
    b. flight path trajectory generating means for converting said reference path signals to flight signals representative of a desired flight path at a predetermined terrain following elevation above said terrain including,
        i. signal storage means for storing and repeating said reference path signals,
        ii. sequential sampling means for reading said reference path signals at preset intervals representing constant increments of distance along said azimuth of flight in order reversed from the direction of flight,
        iii. signal modifying means responsive to said sampling means to modify said reference path signals as read to flight path signals representative of said desired flight path of predetermined terrain-following mode offset from said terrain,
    c. electronic display means for displaying a visual representation of said flight path signals including,
        i. a cathode ray oscilloscope,
        ii. perspective circuit means interconnecting said flight path trajectory generating means and said oscilloscope for converting said flight path signals to a visual graphic line on said oscilloscope representing said desired flight path projected on a vertical plane offset a predetermined distance from said flight path and for adding a modulating signal of high frequency oscillation to cause said visual line to become a vertical band image with height indicating permissible deviation from exact flight path, said perspective circuit means being responsive to said sensing means to cause said band image to decrease in height and converge toward center inversely proportional to the range so as to indicate perspective,
        iii. a heads-up display,
        iv. optical means projecting said band image from said oscilloscope onto said heads-up display as a side boundary fence in registry with terrain features and indicating the desired avenue of flight whereby the desired flight path is indicated as an airspace defined by said boundary fence.

3. Apparatus for assisting manual control in terrain-following mode of an aircraft having means for sensing altitude, speed, and range and deflection to the terrain to be overflown along a projected line of flight, means for computing a desired flight path in terrain-following mode from sensed data, and a heads-up display screen comprising:
a. visual display means,
b. electronic perspective circuit means responsive to an output signal of said means for computing a desired flight path for generating on said visual display means linear visual indicia representing a projection of said desired flight path on a vertical plane displaced a predetermined distance laterally from said flight path,
and for introducing a high frequency sinusoidal signal of predetermined magnitude to broaden said indicia in a direction representative of vertical, and
c. heads-up projector means for projecting said indicia from said display means onto the said heads-up display screen of the aircraft, said electronic perspective circuit means also including range responsive means constricting said indicia and converging said indicia toward center to portray perspective and to permit registry of said indicia with the terrain as viewed through said screen.

* * * * *